Dec. 14, 1943.  H. A. WADMAN  2,336,822
METHOD OF FORMING HOLLOW GLASSWARE
Filed May 9, 1942
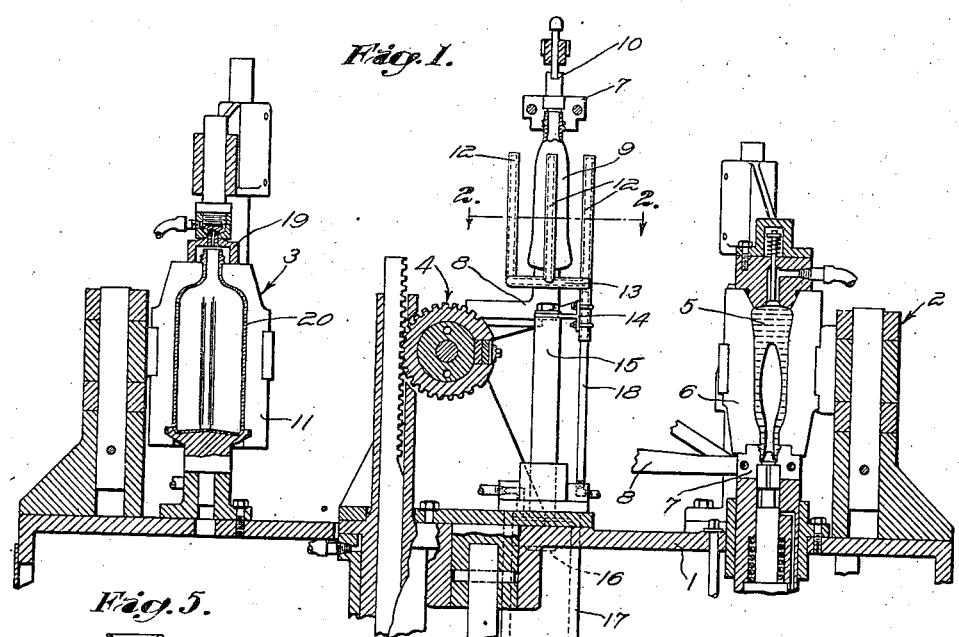
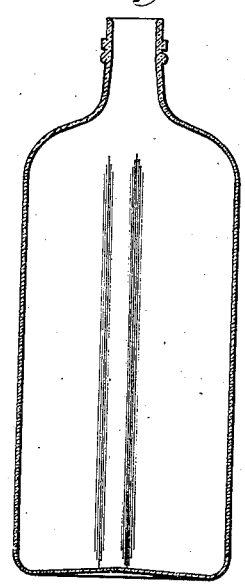
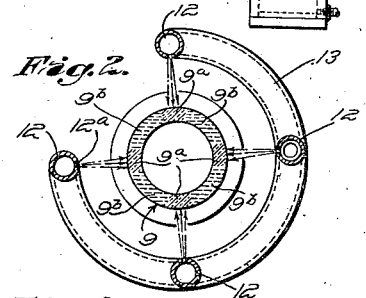
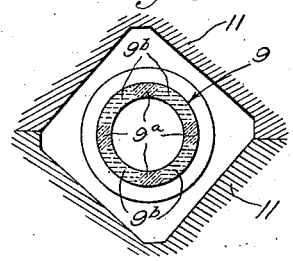
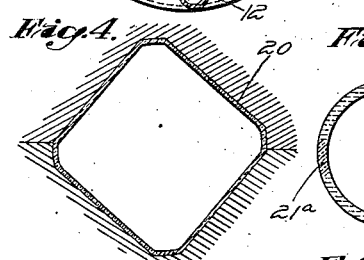
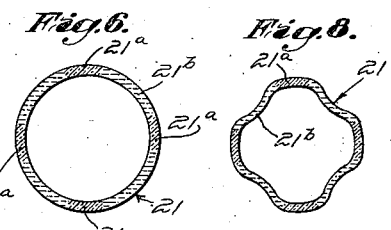
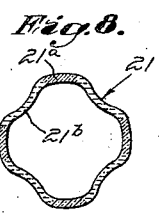
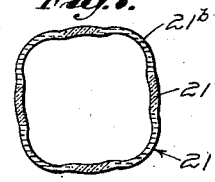
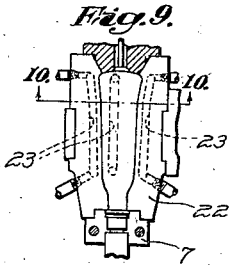
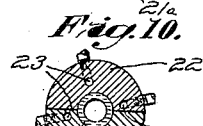
Witness
W. B. Thayer
Inventor
Harold A. Wadman
by Brown & Parham
Attorneys

Patented Dec. 14, 1943

2,336,822

UNITED STATES PATENT OFFICE 2,336,822

METHOD OF FORMING HOLLOW GLASSWARE

Harold A. Wadman, West Hartford, Conn., assignor to Hartford-Empire Company, Hartford, Conn., a corporation of Delaware Application May 9, 1942, Serial No. 442,303

8 Claims. (Cl. 49—80)

This invention relates to methods of forming hollow glassware, such as bottles and jars, especially hollow glass articles which are square, rectangular, oblong, oval, or of other non-circular shape at their body portions. These include so-called "panel" bottles.

It has heretofore been the common practice to make non-circular bottles and other non-circular hollow glassware of generally cylindrical mold charges. Each such charge may have been delivered by an automatic feeder to a parison forming unit comprising an inverted parison mold and neck ring assembly. The cavity of the parison mold of such an assembly generally has been approximately circular in cross-sectional configuration. A hollow parison formed in such an assembly has had a substantially cylindrical body portion. Such parison may have been permitted to reheat for a predetermined period after its removal from the parison mold. It then was transferred to a final blow mold having a cavity that is non-circular in cross-sectional configuration, according to the particular non-circular shape that is to be given to the body of the article that is to be blown to final form therein.

The procedure just described has certain shortcomings. Although the glass of the charge may be reasonably well distributed in the walls of the hollow parison, the final distribution of the glass in the walls of the finally formed non-circular article has been poor. When a generally circular hollow parison is expanded by internally applied pressure fluid within a non-circular cavity of the final blow mold, as in a blow mold cavity that is square in cross-section, the portions of the parison walls next to the flat sides of the final mold cavity are forced into contact with said flat sides early in the period of blowing of the parison. This contact will chill these portions of the walls of the parison and will retard distention thereof while the hotter and less viscous glass of the portions of the parison walls that will form the vertical corner portions of the finally blown article will become disproportionately thin as they are blown outwardly into the vertical corner portions of the blow mold cavity. In consequence, there is poor distribution of the glass of a charge through the walls of a finally formed non-circular article, particularly that the wall of such an article is disproportionately thin at its vertical corner portions.

An object of the present invention is to effect an improved and a better distribution of the glass of a charge in forming a non-circular hollow glass article from such charge.

A further object of the invention is to provide a practical method of acting on the glass of a charge of generally circular cross-sectional configuration, at an appropriate stage in the formation of a non-circular article therefrom, to obviate undesirable thinness of the vertical corner portions of the wall of such article.

A further object of the invention is to provide a novel method of the character described that can be used effectively in a so-called "blow-and-blow" or "narrow-neck" process of forming bottles, jars and other hollow glass articles, and is adapted to be performed by apparatus suitable for inclusion in glassware forming machinery for performing that process.

To carry out the present invention, a charge of molten glass, produced by an automatic feeder or otherwise, may be formed into a hollow parison of generally cylindrical shape in any preferred way and by the use of any preferred parison forming mechanism. After this stage in the formation of a non-circular glass article has been reached, such parison is acted upon according to the present invention to cool locally the longitudinally extending circumferentially spaced portions of the parison wall which will become the longitudinally extending or vertical corner portions of the wall of the finally formed article.

This localized cooling may be effected by applying jets of air or other cooling medium locally to these portions of the parison wall at the outer surface thereof or by placing metal strips or other heat conducting members or means in contact or good heat abstracting relation with such portions of the parison wall. If desired or deemed necessary, heat may be applied to the intervening portions of the parison wall to assure that the glass thereof has the temperature and viscosity desired. Thereafter, the hollow parison is placed within the non-circular cavity of the final blow mold so that the locally cooled, more viscous, longitudinally extending portions of the wall of the parison are in the appropriate positions to be forced outwardly, on blowing, into the corner portions of the blow mold cavity. On such final blowing, these portions of the wall of the parison will resist distention by the blowing pressure more than the intervening less viscous portions. The wall of the finally blown non-circular article will be thicker at the vertical corner portions thereof than has been the case in a generally similar article as produced by the methods and machinery commonly used prior to this invention to produce such an article.

Many variations in and modifications of the hereinbefore generally described mode of using the present invention may be made as individual preference may dictate or particular service conditions may make necessary or desirable. Some of such variations and modifications will hereinafter be pointed out in connection with the description of illustrative ways of and means for performing the invention, as shown in the accompanying drawing, in which:

Figure 1 is a partial vertical sectional view of the glassware forming machine of my Patent No. 2,151,876, of March 28, 1929, and of one form of cooling mechanism as applied thereto to effect local cooling of spaced vertical portions of the wall of the hollow parison in accordance with the present invention;

Fig. 2 is a relatively enlarged section substantially along the line 2—2 of Fig. 1 through the parison wall cooling means of the apparatus shown in Fig. 1;

Fig. 3 is a fragmentary horizontal section of the portion of the final blow mold walls around the non-circular cavity therein and of the body of the generally cylindrical hollow parison in centered position in the blow mold cavity;

Fig. 4 is a view similar to Fig. 3 after the parison has been expanded by blowing pressure against the wall of the cavity of the final blow mold;

Fig. 5 is a longitudinally vertical section through a non-circular bottle which may have been formed in accordance with the present invention, as by the operation of the apparatus shown in Fig. 1;

Fig. 6 is a cross-section through the cylindrical wall of a hollow glass parison after circumferentially spaced portions of that wall have been locally cooled in accordance with the present invention;

Fig. 7 is a cross-section of the parison wall of Fig. 6 after such parison has been puff blown to stretch somewhat the intervening portions of the parison wall between the locally cooled portions, as may be accomplished by the structure shown in Fig. 1;

Fig. 8 shows the same parison wall at a stage after the puff blowing operation and after the previously stretched intervening portions of the parison wall between the locally cooled portions have been permitted or caused to collapse slightly;

Fig. 9 is a fragmentary view of a contact mechanism for effecting local cooling of the circumferentially spaced vertical portions of the hollow parison wall; and Fig. 10 is a cross-section through the structure of Fig. 9, as taken along the line 10—10 of Fig. 9.

The glassware forming machine of my Patent 2,151,876 as partially shown in Fig. 1 comprises a supporting base or platform member 1 on which are mounted a parison forming mechanism indicated generally at 2, a final article forming mechanism indicated generally at 3 and an intermediate transfer mechanism indicated generally at 4.

The parison forming mechanism 2 is constructed and arranged for operation in the complete machine so that periodically it will receive a charge of molten glass (not shown) and will form that charge into an inverted hollow parison such as that indicated at 5. The parison forming mechanism includes an inverted parison mold 6 and an inverted neck ring 7 therebeneath, in which the parison 5 is formed. The parison mold 6 and the neck ring 7 may each be made in cooperative halves, as is usual.

After a hollow parison 5 has been formed in the parison forming mechanism 2, such mechanism is opened to permit removal of the parison by the neck ring 7, the halves of which may be carried by arms, represented by those shown at 8, Fig. 1, which arms constitute elements of the transfer mechanism.

The transfer mechanism of the machine of my Patent 2,151,876 comprises two of the neck rings 7 each mounted on its supporting transfer arms. Thus, when one of the neck rings 7 is located in inverted position beneath the parison mold 6 at the parison forming station, the second neck ring 7 may be located at an intermediate parison reheat station, where it supports in an upright suspended position the previously formed hollow parison. The latter is designated 9.

In the operation of the aforesaid glassware forming machine, the parison 9 may be held at the position shown in the middle portion of Fig. 1 for a predetermined reheating period during which the hotter interior glass of the parison wall gives up some of its heat to the colder outer surface glass. During this period of reheating, puff blowing of the parison may be effected, if desired, as by air supplied thereto through the nozzle 10 and the parison-supporting neck ring. Thereafter, the transfer mechanism may function to move the parison from the intermediate reheat station to a final blowing station, at which the parison will be in position to be enclosed by the halves of the blow mold 11 of the final article forming mechanism 3. When the parison has been delivered to the final blow mold 11, the neck ring by which the transfer of the parison has been effected may be opened to release the parison and such neck ring then may be returned to its initial position beneath the blank mold 6 of the parison forming mechanism. In the meantime, the other neck ring, with its hollow parison, has moved from a position beneath such parison mold 6 of the parison forming mechanism 2 to the intermediate parison reheating station.

When a cooling mechanism for use in performing the method of the present invention has been applied to the machine just described, the parison 9 may be acted upon at the intermediate reheating station to cool locally the appropriate spaced vertical portions of the parison wall as and for the purpose hereinbefore pointed out. This may be done by directing jets of air radially inward from spaced vertical air nozzles 12, Figs. 1 and 2, surrounding the parison, against the appropriate circumferentially spaced vertical portions of the parison body wall. These nozzles may comprise pipes closed at their upper ends and in open communication at their lower ends with a hollow base member 13. This base member may comprise a pipe bent arcuately to form a sufficiently large part or segment of a complete ring or annulus to afford support for the equidistantly spaced upstanding nozzles 12, of which there are four in the example shown. The base 13 may be carried by a bracket 14 on the upper end of an upwardly projecting vertical rod 15. The rod 15 is carried by a vertically movable piston 16 in a vertical cylinder 17, which may be supported by the machine base or platform member 1.

Air under pressure may be supplied to the hollow member 13 and thence to the nozzles 12 through a suitable supply pipe 18 which may be connected with any suitable source of supply (not shown) of compressed air or other pressure fluid for the cooling jets. The nozzles 12 are provided with a vertical series of spaced jet holes 12a for directing jets of the cooling fluid radially inward against the vertical portions of the wall of the parison which are to be locally cooled so as to be rendered more viscous than the intervening portions of the parison wall. These jet holes may be sufficiently close in any vertical series to cause jets therefrom to combine to form what in effect is a vertical sheet or ribbon of cooling fluid applied to the portion of the parison wall that is to be locally cooled. If deemed necessary or desirable to assure uniformity of cooling along the entire length of the portions of the parison wall that are to be cooled, the cooling nozzles may be shifted vertically during their operation. If desired, the intervening portions of the parison wall may be subjected to a heating influence from any suitable known heating means.

After local cooling of spaced vertical portions of the wall of the parison 9 so that such wall will comprise circumferentially spaced cooler and more viscous portions, designated 9a, and intervening hotter and less viscous portions, 9b, Fig. 2, such parison then may be transferred by the transfer mechanism 4 to the non-circular cavity of the blow mold 11 as shown in Fig. 3. Thereafter, air may be applied to the interior of this parison, as from the final blow head 19 of the final article forming mechanism 3 to blow out the walls of the parison against the walls of the blow mold cavity to form a finally blown non-circular hollow glass article, such as the square bodied bottle 20 shown in cross-section in Fig. 4 and in vertical section in Figs. 1 and 5. It will be noted that there is a good distribution of the glass throughout the wall of the non-circular finally blown article and that the vertical corner portions of the wall of the body of the bottle have not been formed to be disproportionately thin, as frequently occurred when bottles of this shape were formed of substantially cylindrical hollow parisons by the use of prior bottle-forming methods and apparatus.

In practicing the invention by an alternative or modified method, a generally cylindrical hollow parison, designated 21, Fig. 6, may be formed and acted upon as previously described so that its wall will comprise spaced cooler and more viscous portions 21a and intervening hotter, less viscous portions 21b. Air for puff blowing may then be admitted to this parison, as for example, while it is at the intermediate parison reheating station shown in Fig. 1. The puff blowing will distend and stretch slightly the intervening less viscous portions 21b between the cooler, stiffer portions 21a, as shown in Fig. 7. Thereafter, these slightly stretched portions 21b may be permitted to collapse slightly as shown in Fig. 8. If deemed desirable or necessary, suction may be employed to aid this operation, as through the puff blowing mechanism shown in Fig. 1 after the puff blowing air has been cut off. Thereafter, the parison may be transferred to the final blow mold and blown to final form therein, as previously described.

The local cooling of the circumferentially spaced vertical portions of the wall of a substantially cylindrical hollow parison that subsequently is to be blown into a non-circular hollow glass article may be effected at an earlier or later stage in the cycle of article forming operations than the reheating stage hereinbefore mentioned and at places other than the intermediate parison reheating station. For an illustrative example of relatively early local cooling of appropriate vertical portions of the parison wall, attention is directed to Figs. 9 and 10 which show a parison mold 22 made in cooperative halves, as is usual, and provided with longitudinally extending cooling passages 23 located radially outward from the portions of the wall of the parison body 24, Fig. 10, which are to be locally cooled in accordance with the present invention. A suitable cooling fluid may be circulated through the passages 23. These passages 23 are in sufficiently good heat abstracting relation with the immediately adjacent vertical portions of the cylindrical parison wall to cool such portions of the parison wall more than the intervening portions thereof, similarly to the hereinbefore described action of the air jets. In the operation of this embodiment of the invention, the local cooling of the spaced vertical portions of the hollow parison wall may be accomplished at the parison forming station and by use of the parison mold as the cooling medium. Instead of the spaced water cooled portions, such a parison mold may be constructed to have portions of higher conductivity next to the portions of the parison to be locally cooled than that of the mold portions next to the intervening portions of such parison.

The relatively greater cooling of the circumferentially spaced vertical portions of the hollow parison in accordance with the present invention may be effected by various means and in various ways specifically different from those hereinbefore pointed out. The invention therefore is not limited to the details of the illustrative ways and means herein particularly described.

What I claim is:

1. The method of forming non-circular glassware which comprises forming a hollow parison of approximately circular cross-sectional configuration, cooling circumferentially spaced longitudinally extending portions of the parison to make the portions thereof which will form the longitudinal corner portions of a non-circular article of glassware more viscous than the intervening portions, and then blowing the hollow parison to the shape of the non-circular article desired so that said more viscous portions of the parison form the longitudinal corner portions of said article.

2. The method of forming non-circular hollow glassware which comprises forming a parison of generally circular cross-sectional configuration, abstracting relatively more heat from longitudinally extending circumferentially spaced portions of the parison wall to make these portions cooler and more viscous than the intervening portions of the parison, placing said parison in a non-circular blow mold cavity so that said cooler, more viscous portions of the parison are located radially inward from the corner portions of the blow mold cavity, and blowing said parison to final form in said blow mold cavity.

3. The method of forming non-circular hollow glassware which comprises forming a parison of generally circular cross-sectional configuration, applying a cooling influence locally to each of a plurality of circumferentially spaced longitudinally extending portions of the parison, placing said parison in a final blow mold cavity having vertical corner portions located radially outward from said locally cooled portions of the parison, and blowing said parison to final form in said blow mold cavity.

4. The method of forming non-circular hollow glassware which comprises forming a hollow parison of generally circular cross-sectional configuration, applying a cooling fluid to circumferentially spaced longitudinally extending portions of the parison wall to cool these portions to a more viscous condition than the intervening longitudinally extending portions of said parison wall, placing said parison in a blow mold cavity of non-circular cross-section so that said more viscous longitudinally extending portions of the parison wall are located radially inward from the vertical corner portions of the blow mold cavity, and blowing the parison to final form in said blow mold cavity.

5. The method of forming non-circular hollow glassware which comprises forming a hollow parison of generally circular cross-sectional configuration, applying a cooling fluid to circumferentially spaced longitudinally extending portions of the parison wall to cool these portions to a more viscous condition than the intervening longitudinally extending portions of said parison, puff blowing said parison to stretch said intervening longitudinally extending portions of said parison wall, then placing said parison in a blow mold cavity of non-circular cross-section so that said more viscous longitudinally extending portions of the parison wall are located radially inward from the vertical corner portions of the blow mold cavity, and blowing the parison to final form in said blow mold cavity.

6. The method of forming non-circular hollow glassware which comprises forming a hollow parison of generally circular cross-sectional configuration, applying a cooling fluid to circumferentially spaced longitudinally extending portions of the parison wall to cool these portions to a more viscous condition than the intervening longitudinally extending portions of said parison wall, puff blowing said parison to stretch said intervening longitudinally extending portions of said parison wall, causing partial inward collapse of said stretched intervening longitudinally extending portions, then placing said parison in a blow mold cavity of non-circular cross-section so that said more viscous longitudinally extending portions of the parison wall are located radially inward from the vertical corner portions of the blow mold cavity, and blowing the parison to final form in said blow mold cavity.

7. The method of forming non-circular hollow glassware which comprises forming a parison of generally circular cross-sectional configuration, abstracting relatively more heat from longitudinally extending circumferentially spaced portions of the parison than from the intervening longitudinally extending portions by the contact of a glass cooling surface with each of said first-named portions of the parison, transferring the parison to a non-circular blow mold cavity having vertical corner portions located radially outward from the first-named portions of said parison, and blowing said parison to final form in said blow mold cavity.

8. The method of forming non-circular hollow glassware which comprises forming a hollow parison of generally circular cross-sectional configuration in a parison mold, disproportionately cooling circumferentially spaced longitudinally extending portions of the wall of the parison in said parison mold, thereafter transferring the parison to a non-circular blow mold cavity having vertical corner portions located radially outward from the disproportionately cooled longitudinally extending portions of the parison, and blowing said parison to final form in said blow mold cavity.

HAROLD A. WADMAN.